United States Patent [19]
Hollingsworth

[11] 3,711,119
[45] Jan. 16, 1973

[54] SUSPENSION MEANS FOR MUD FLAPS

[76] Inventor: Alan L. Hollingsworth, 3008 Bennington Drive, Springfield, Ill. 62704

[22] Filed: Dec. 9, 1970

[21] Appl. No.: 96,534

[52] U.S. Cl. ................................280/154.5 R
[51] Int. Cl. ...................................B62d 25/16
[58] Field of Search ..............280/154.5 R, 154.5 A; 24/201 S, 230 LP

[56] References Cited

UNITED STATES PATENTS

| | | | |
|---|---|---|---|
| 3,401,953 | 9/1968 | Prohl et al. | 280/154.5 R |
| 3,333,868 | 8/1967 | Sogoian | 280/154.5 R |
| 2,291,674 | 8/1942 | Alden | 24/201 S |
| 2,054,361 | 9/1936 | Cohen | 280/154.5 R |
| 3,095,215 | 6/1963 | Black | 280/154.5 R |
| 3,219,363 | 11/1965 | Dalsey et al. | 280/154.5 R |
| 3,158,386 | 11/1964 | Tillinghast et al. | 280/154.5 R |
| 2,755,484 | 7/1956 | Hotz | 52/509 |

*Primary Examiner*—Leo Friaglia
*Assistant Examiner*—Robert R. Song
*Attorney*—Clarence A. O'Brien and Harvey B. Jacobson

[57] ABSTRACT

A safety-type intercepting and anti-splashing mud flap for use in conjunction with the rearward tread surfaces of dual tractor-trailer wheels and which is unique in that the upper edge is provided with specially designed hanger bolts, more particularly, bolts whose convex headed ends provide attaching keepers. These keepers are lodged and retentively but releasably fitted into their respectively cooperable keeper slots. A spring metal clip is provided for each keeper and is yieldingly and clampingly engageable with the coordinating keeper head. The free end of the clip is concavo-convex and when being used it snaps into place but functions to free the cooperable keeper at will.

3 Claims, 4 Drawing Figures

PATENTED JAN 16 1973
3,711,119
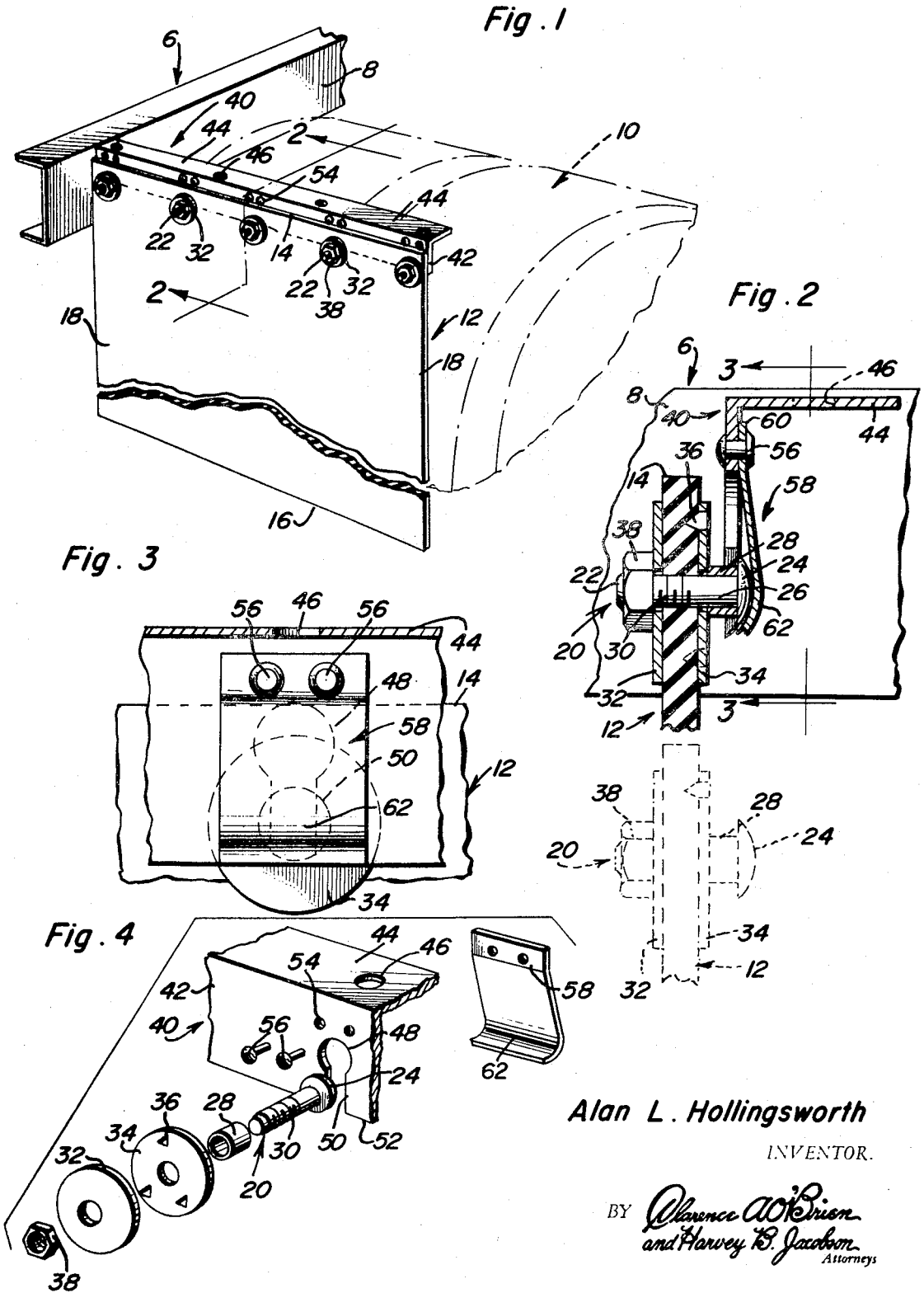
Alan L. Hollingsworth
INVENTOR.
BY Clarence A. O'Brien
and Harvey B. Jackson
Attorneys

SUSPENSION MEANS FOR MUD FLAPS

This invention relates to anti-splashing safety-type intercepting and deflecting mud flaps and wheel guards such as are currently used in conjunction with tractor-trailer wheels and has to do with a mud flap whose upper marginal attaching edge is equipped with structurally novel means for detachably mounting the flap from novelly improved suspension means.

It is a matter of common knowledge that trucks, particularly tractor-trailers, are equipped with anti-splashing mud flaps and wheel guards which are suspended in many and varying ways and function to block and prevent stones, debris and dangerous objects from being forcibly thrown back against pedestrians and, more particularly, following vehicles. Not only are mud flaps needed and required for safeguarding purposes, they are often ineffective and dangerous when they are wholly or partly torn loose from their attaching brackets and involve difficulties too extensive to dwell upon here but which are set forth in ever varying ways in analogous prior patents and publications.

With a view toward coping with certain of the many and varied problems persons working in the field of endeavor under advisement have seen fit to provide various adapters and equipment whereby mud flaps are capable of being detachably and replaceably mounted. Even so and nevertheless it appears that prior art adaptations have not, or so it would seem, met with widespread unqualified adoption and use.

For background information the reader may desire to evaluate the stress removable splash guard disclosed in U.S. Pat. No. 3,158,386 granted to David G. Tillinghast et al. which shows a splash guard which permits the same to be forcibly removed from its mounting and generally so without destroying the same. As further indicative of the state of the art to which the invention relates reference can be made, if so desired, to the mud flap support disclosed in U.S. Pat. No. 3,333,868, granted to Nash P. Sogoian.

An object of the present invention is to improve upon attachable and detachable mud flaps and, in so doing, to advance the art and to provide what is believed to be an adaptation which is simple, practical, reliable and is well adapted to serve the purpose for which it has been devised and successfully used.

Briefly and as will be hereinafter more fully evident the mud flap functions as an anti-splashing and object intercepting and deflecting shield. It is generally rectangular, flexible and basically similar to commonly used flaps in that it is proximal to and is adapted to be cooperatively oriented with the chassis frame and the rearward surfaces or treads of the tractor or trailer wheels as the case may be. The mud flap mounting and suspension means constitutes a feasible and reliable bracket for suspension of the upper marginal portion of said flap. This suspension means has downwardly opening keeper slots, any suitable number thereof. The upper marginal edge portion of the mud flap has securely anchored fasteners which provide mud flap attaching keepers. These keepers are lodged retentively but releasably in keeper slots which are provided therefor, more particularly keyhole shaped slots whose lower ends open through the lower edge of the suspension means. In addition stress and strain responsive retainer means, simple cleats or clips, are provided for each keeper slot. These clips coact with the keeper heads on the headed fasteners. The retainer clips clampingly engage with the keeper heads with which they are coordinated and function to free the keepers if and when the mud flap is subjected voluntarily to a downward pull exerted by hand and, alternatively, to any one of a number of excessive yanking and abnormal pulling forces which would under certain circumstances be encountered when the mud flap is caught between the wheel, a loading platform, a curb or for some other reason.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective showing a fragmentary portion of one channel or frame member of the vehicle chassis, the dual ground-engaging wheels in phantom lines and showing, what is more important, the depending mud flap and how the upper end is detachably bracketed in place.

FIG. 2 is an enlarged detail section taken approximately on the plane of the irregular section line 2—2 of FIG. 1 looking in the direction of the indicating arrows.

FIG. 3 is an enlarged fragmentary detail view with parts in section and elevation taken on the plane of the vertical section line 3—3 of FIG. 2.

And FIG. 4 is an exploded perspective view showing the principal component parts in orderly relationship with the associated flap omitted.

With reference to FIGS. 1 to 3 it will be seen that the numeral 6 designates a fragmentary portion of a frame member, that is one of the frame members of a vehicle chassis and whose web is denoted at 8. The twin or dual ground-engaging or traction wheels are denoted at 10 and appear in phantom lines in FIG. 1.

The apron-like depending mud flap (anti-splash wheel guard) is denoted by the numeral 12. Insofar as the guard by itself is concerned it is comparable with types of guards which are currently being used on tractor-trailers, trucks and the like. For sake of a better understanding the upper marginal edge is denoted at 14, the lower or bottom edge at 16 and the vertical marginal edges at 18. The upper edge of this flap is distinct and different in that it is provided at longitudinally spaced points with suitably aligned attaching fasteners. Each fastener is of the construction detailed in FIG. 2 in particular. This is to say the fastener is a screw-threaded headed fastener which is herein referred to as a bolt 20, the screw-threaded shank being denoted at 22, the convex button-like head at 24 and the optional or smooth surface portion at 26. This portion in practice serves to accommodate a sleeve-like bushing 28. The screw-threaded portion is denoted at 30. The shank of the bolt passes through a hole provided therefor in the mud flap as is best shown in FIG. 2 and reinforcing washers are provided, the rear washer being denoted at 32 and the complemental forward washer at 34, the washer 34 being provided with prongs 36 which are embedded in the surface of the flap. These washers are of duplicate size and one washer is interposed and held in place by the assembling and clamping nut 38 on the threaded shank and the other washer is interposed between the spacing bushing or collar 28 as illustrated in FIG. 2. Thus the upper edge portion 14 is provided with a series of properly attached and reinforced headed fastening bolts. The convex head portions 24 are conveniently designated as keepers.

The adapter means for bracketing the thus constructed flap in place may vary in construction and can be attached to the frame member or it can be bolted or otherwise secured to the body of the truck, tractor or trailer as the case may be (not shown). This adapter means can be also referred to as a rail or broadly as a suspension member. In practice is is preferably in the form of a horizontally elongated angle iron and is denoted, generally stated, by the numeral 40. It has a vertical or depending flange 42 and a horizontal flange 44. The flange 44 is provided with bolt holes 46 whereby it can be bolted (not detailed) to a support surface. The vertical flange 42 is provided with a plurality of correspondingly constructed keyhole shaped slots which are referred to as keeper slots or notches. The upper enlarged end portions are denoted at 48 and the narrow neck portions at 50, these portions opening downwardly through the lower edge 52 of the flange 42. The holes 54 serve to accommodate rivets 56 which are employed in attaching a retainer in place. The retainer, more specifically, comprises a spring steel or correspondingly made cleat or clip 58. This cleat has its upper end 60 riveted in place by the associated rivet 56. The lower end portion of this cleat or clip is arcuately bent and suitably dished as at 62 and conformingly serves to nest and seat the button-like head 54 when the parts are assembled and readied for use in the manner detailed with particularity in FIGS. 2 and 3.

The disclosed invention as emphasized has to do with an attachable and detachable mud flap and suspension means therefor designed and adapted to be utilized on any vehicle which is required to intercept and deflect foreign objects normally encountered on roadbeds and which could be dangerously thrown rearwardly by vehicle tires in a well known and highly objectionable manner. It is such in construction and adaptability that it allows for adequate and expedient installation on the vehicle and it furnishes a simple ways and means of attachment and removal of the mud flap from the suspension or support beam 40. The removal of the flap 12 from the suspension member can be accomplished by hand operation or automatically through friction force applied to the flap from the tires or appendages of a vehicle or other surface with which it may have contact. No tools are required for installation and further re-use of the flap is permissible.

When the flap is installed as illustrated for example in FIG. 1 it is in the normal position for its intended use and will remain there unless removed by reversal of the aforementioned insertion procedure or by a downward force exerted by hand pressure or firm contact is made between the tires or other vehicle appendages and a relatively stationary object or surface, Such contact will automatically remove the flap from the hanger or suspension bracket but it can be again replaced by hand in the previously mentioned insertion procedure.

It can and perhaps should be mentioned at this point that the number and size of the holes 46 will vary and that the illustration in FIG. 1 is therefore not necessarily restrictive. It should also be mentioned at this stage that the holes indicated as 46 are ordinarily the means by which the suspension assembly will be attached to the vehicle chassis but, manifestly, customer options of attachment are within the purview of the inventive concept. Further, it should be added that the angle iron 40 may in actual practice be replaced by some mechanical equivalent part and may be larger in transverse cross-sectional dimension (not shown). Then too, it is to be mentioned that bolt 20 as already intimated can be threaded throughout its entire length or if feasible, a partially smooth surface as at 26 may prove out to be more suitable.

It is submitted that a careful consideration of the views of the drawing will enable the reader to obtain a clear and comprehensive understanding of the details, how they are individually constructed and assembled and how the over-all device is installed and readied for safe and practical use. Accordingly, a more extended description is deemed to be unnecessary.

The foregoing is considered as illustrative only of the principles of the invention. Further, since numerous modifications and changes will readily occur to those skilled in the art, it is not desired to limit the invention to the exact construction and operation show and described, and accordingly all suitable modifications and equivalents may be resorted to, falling within the scope of the invention as claimed.

I claim:

1. For use in conjunction with a vehicle chassis frame member and dual ground engaging traction wheels adjacent and associatively cooperable with said frame member, an intercepting and anti-splashing mud flap proximal to and adapted to be cooperatively oriented with said frame member and rearward tread surfaces of said wheels, mud flap mounting and suspension means for an upper marginal edge portion of said mud flap, said suspension means having downwardly opening keeper slots, said upper marginal edge portion of said mud flap having securely anchored headed fasteners providing mud flap attaching keepers, said keepers being lodges retentively but releasably in their respectively cooperable keeper slots, and a stress and strain responsive retainer for each keeper slot and coacting keeper, said retainer being clampingly engageable with the keeper with which it is coordinated but functioning to free the keeper if and when said mud flap is subjected (1) to a downward pull intentionally exerted by hand manipulation or (2) when any one of a number of excessive yanking and abnormal forces are accidentally imposed on said mud flap, said suspension means comprising a rigid horizontally elongated beam embodying a vertical flange, said slots being keyhole-shaped in configuration, said headed fasteners each comprising a bolt having a screw-threaded shank piercing the mud flap and anchored on said flap by a nut and flap reinforcing and bolt anchoring washers, said shank having a projecting but terminal head and the headed end portion of said shank providing the aforementioned keeper and being provided with a bushing which is fittingly lodged in a selected open end portion of said keeper slot, each retainer comprising a spring metal clip an upper end of which is riveted and anchored, the lower end being bendably free and having a concaved seat for conformable reception and yieldable but clamping retention of said keeper, said keeper having a convex head which is normally conformably lodged and releasably retained in said concave seat.

2. For use in conjunction with a vehicle chassis frame member and dual ground engaging traction wheels adjacent and associatively cooperable with said frame member, an intercepting and anti-splashing mud flap proximal to and adapted to be cooperatively oriented with said frame member and rearward tread surfaces of said wheels, said mud flap having an upper longitudinal marginal edge provided with a plurality of spaced individual flap attaching fasteners, each fastener comprising a bolt having a nut-equipped shank which is anchored by reinforcing washers in a given spot on said marginal edge and having a forwardly projecting end terminating at a forward end in a convex button-like keeper head, a collar-like bushing surrounding the projecting shank and held captive on said shank by said head, a mud flap mounting and suspension beam adapted to be supportively mounted for use on said chassis frame member and embodying a depending vertical flange provided along a lower longitudinal marginal edge with keyhole-shaped keeper slots having open lower ends opening through said lower marginal edge, said slots being adapted to insertably and removably accommodate and retentively receive the headed bushing-equipped ends of the insertable and removable shanks, and a retainer for and cooperatively aligned with each keeper slot said retainer being fixedly connected to said depending flange and having means for clampingly but releasably retaining the keeper head with which it is aligned and coordinated but functioning to free the bolt, bushing and keeper head if and when said mud flap is subjected (1) to a downward pull intentionally exerted by hand manipulation or (2) when any one of a number of excessive yanking and abnormal forces are imposed on said mud flap under ever varying conditions.

3. The mud flap and suspension means defined in and according to claim 2, and wherein said retainer comprises a spring metal clip one end of which is anchored on a forward surface of said vertical flange and the other end bendably free and having a rearwardly concaved keeper seat for conformable reception and yieldable but clamping retention of said keeper, the convex head of said keeper being normally lodged and clampingly held in said keeper seat.

* * * * *